No. 675,320. Patented May 28, 1901.
E. A. BOYNE.
COUPLING FOR TUBES OR PIPES.
(Application filed June 7, 1900.)
(No Model.)
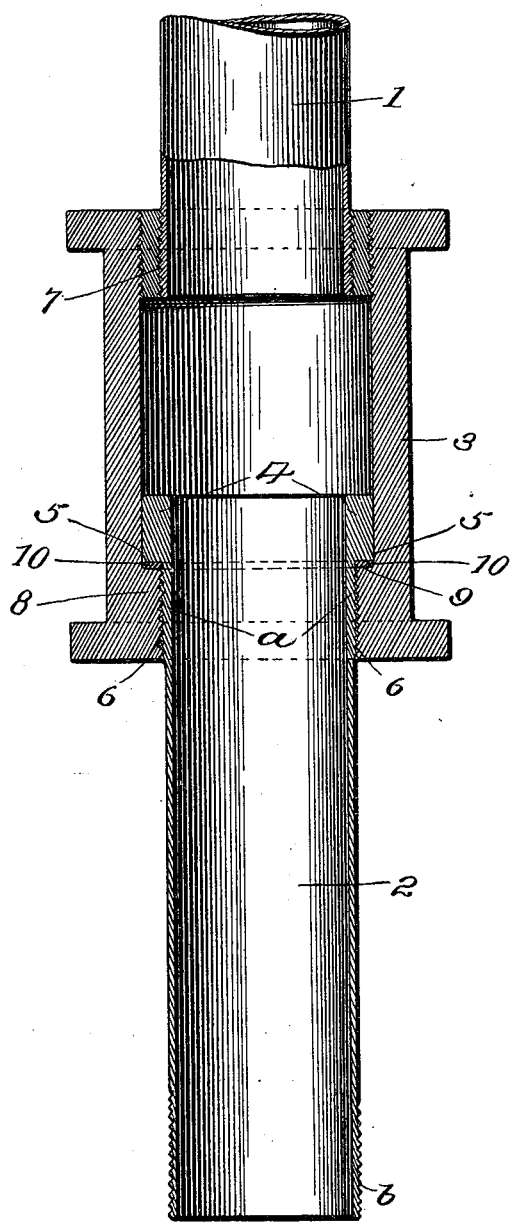
Inventor
Edward A. Boyne.
Witnesses
By J. R. Nottingham Attorney
THE NORRIS PETERS CO., PHOTO-LITHO., WASHINGTON, D. C.

UNITED STATES PATENT OFFICE.

EDWARD A. BOYNE, OF BRADFORD, PENNSYLVANIA.

COUPLING FOR TUBES OR PIPES.

SPECIFICATION forming part of Letters Patent No. 675,320, dated May 28, 1901.

Application filed June 7, 1900. Serial No. 19,390. (No model.)

*To all whom it may concern:*

Be it known that I, EDWARD A. BOYNE, a citizen of the United States, residing at Bradford, in the county of McKean and State of Pennsylvania, have invented certain new and useful Improvements in Couplings for Tubes or Pipes; and I do hereby declare the following to be a full, clear, and exact description of the invention, such as will enable others skilled in the art to which it appertains to make and use the same.

My invention relates to couplings for tubes or pipes, but is more particularly applicable to the tubes or pipes of gas and oil wells; and it consists, essentially, of the novel construction and combination of the several parts, as will be hereinafter more fully described, and particularly stated in the claim.

The prime object of the invention is to provide a coupling by means of which the tube or pipe sections of gas and oil wells will be prevented from separating and dropping into the well in case of fire in the well or the destruction of the derrick by severe wind-storms. It is a well-known fact that the heat generated by a fire in an oil or gas well will cause the coupling or collar now in use to expand, and thereby allow the lower sections of tubing or pipe to drop down into the well, frequently resulting in the expenditure of much time and money to repair the damage caused thereby. This same result occurs from the breaking of the sections at the coupling-point, and the breaking is caused by the lateral strain to which the oil tube or pipe is subjected by the wrecking of the derrick in wind-storms.

Another object of the invention is to so construct the coupling that all of its parts will be sufficiently strong to resist any strain to which it may be subjected.

Other objects will become apparent upon the further description of the invention.

The figure illustrated in the accompanying drawing represents a longitudinal sectional view of my improved coupling, showing two sections of the oil tube or pipe coupled together.

In the drawing the numerals 1 and 2 indicate two sections of an oil-well tube, and 3 the coupler or collar for coupling the two sections together. The upper end of the lower section is formed with an outwardly-extending flange or collar 4, which provides an annular shoulder 5, the object of which will be hereinafter explained. For a short distance below the flange the section is slightly thickened, as shown at $a$, so as to provide for the cutting of the threads 6 without weakening the section at that point. The lower end of each section is screw-threaded, as shown at $b$. The upper end of the coupler or collar is internally screw-threaded to receive an externally and internally screw-threaded reducing-collar 7, into which the lower end of the upper section is screwed. The lower end of the coupler is formed with an internally-screw-threaded flange 8, which provides an annular shoulder 9, upon which the shoulder of the flange 5 on the tube-section seats when the coupler or collar is in position.

In making the coupling the section 2 is slipped through the coupler or collar 4 and screwed into position, with the shoulders 5 and 9 contacting. If desired, a gasket 10 of any suitable material may be interposed between the shoulders to form a more perfectly tight joint, although it will be understood that the coupling without the interposition of a gasket is sufficiently tight for all practical purposes.

As thus constructed my improved coupling possesses many advantages over the one now in use, especially in that there is absolutely no chance for the tube or pipe sections to separate and drop down into the well.

Having thus fully described my invention, what I claim, and desire to secure by Letters Patent, is—

In a tube or pipe coupling for oil or gas wells, the combination with a pipe-section 2 having at its upper end an outwardly-extending flange or collar 4, providing an annular shoulder 5, and having below said shoulder a thickened portion $a$ provided with screw-threads, of a coupler or collar 3 having its upper end internally screw-threaded and its lower end provided with an inwardly-extending screw-threaded flange 8 providing an annular shoulder 9, said shoulder being adapted to seat and support the annular shoulder 5 of the section 2, whereby the section 2 will be prevented slipping from the coupler 3 and falling into the well should there be a shrinkage of the section 2, as set forth.

In testimony whereof I affix my signature in the presence of two witnesses.

EDWARD A. BOYNE.

Witnesses:
A. C. NEWMAN,
J. R. NOTTINGHAM.